Figure 1:
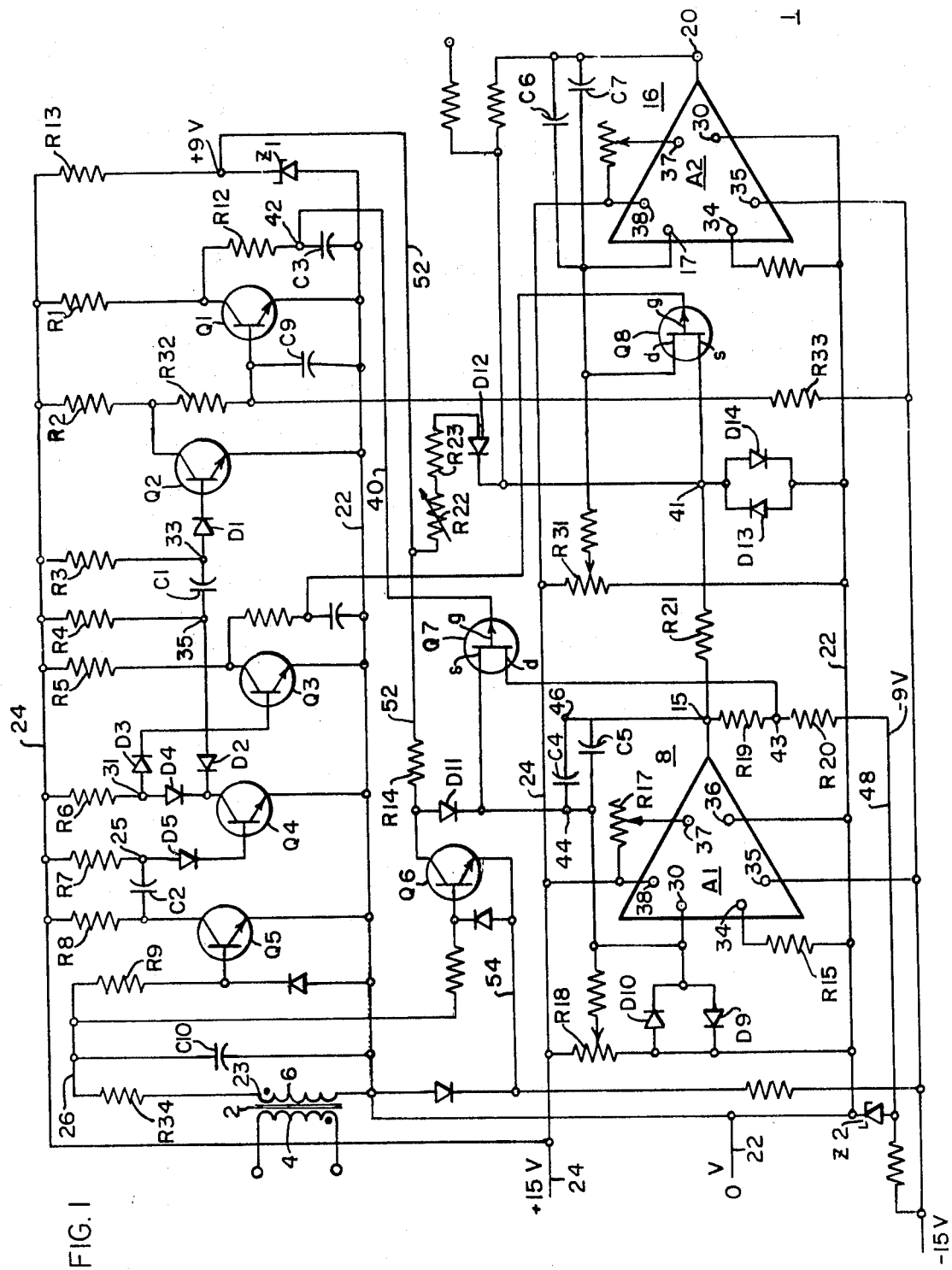

United States Patent

[11] 3,590,277

| | | |
|---|---|---|
| [72] | Inventor | William H. South<br>McKeesport, Pa. |
| [21] | Appl. No. | 822,411 |
| [22] | Filed | May 7, 1969 |
| [45] | Patented | June 29, 1971 |
| [73] | Assignee | Westinghouse Electric Corporation<br>Pittsburgh, Pa. |

[54] FAST RESPONSE FREQUENCY AND WAVE SHAPE MEASURING CIRCUIT
13 Claims, 4 Drawing Figs.

[52] U.S. Cl. ................................................. 307/233,
307/228, 307/295, 324/78 E, 328/140
[51] Int. Cl. ............................................... H03k 5/20
[50] Field of Search ......................................... 328/133,
134, 140, 141; 307/233, 228, 295; 324/78

[56] References Cited
UNITED STATES PATENTS

| | | | |
|---|---|---|---|
| 2,878,448 | 3/1959 | Maxey ........................ | 324/79 |
| 2,921,260 | 1/1960 | Crandon et al. .............. | 324/78 |
| 3,074,015 | 1/1963 | Gerber ........................ | 328/140 X |
| 3,274,500 | 9/1966 | Bengston .................... | 328/140 X |
| 3,398,366 | 8/1968 | Apfelbeck .................... | 328/141 X |

Primary Examiner—Stanley D. Miller, Jr.
Attorneys—A. T. Stratton, C. L. Freedman and John L. Stoughton ABSTRACT: A measuring network in which a ramp generator is energized throughout each alternate half cycle of the frequency to be measured and in which the ramp generator is reset to an initial potential during each of the intervening half cycles whereby the change in potential of the ramp generator is a measure of the half cycle interval and consequently of the frequency when the wave shape remains constant, a measure of changes in wave shape of the cycle when the frequency is constant, and a measure of the frequency regardless of the wave shape when the output quantities of two such networks are summed; one such network measuring the interval of one half cycle and the other measuring the interval of the other half cycle.

INVENTOR
William H. South

BY
John L. Houghton
ATTORNEY 3,590,277

FAST RESPONSE FREQUENCY AND WAVE SHAPE MEASURING CIRCUIT

BACKGROUND OF THE INVENTION

In order to stabilize the operation of large interconnected power systems, some means is required to introduce a damping signal to the excitation systems of the individual generators. Various signal sources may be used to supply this damping intelligence such as electric power, machine frequency, or machine speed. In order for this damping signal to be effective in stabilizing oscillations, the time required for the measurement of the signal should be as small as possible. A practical limit is approximately 0.04 seconds delay in the transducer which measures the damping signal. Conventional transducers usually have filter elements and these provide a time delay much longer than 0.04 seconds.

It is an object of this invention to provide a frequency transducer that will respond to changes in half cycle wave in approximately 0.02 seconds.

A further object is to provide such a transducer in which the output signal is smooth and ripple free and can be used in conjunction with other lead-lag circuit elements to produce the desired damping characteristics.

Another object of this invention is to provide such a transducer in which the normal frequency usually 60 Hz. may be used as a reference point and in which the output potential of the transducer will change in polarity and magnitude as the frequency measured thereby varies from the desired normal frequency.

Figure 2:
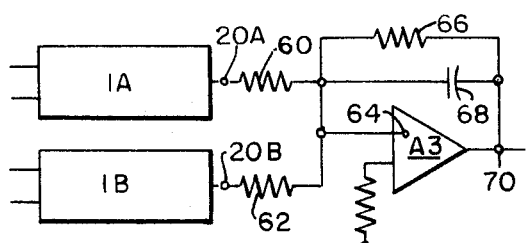
Figure 4:
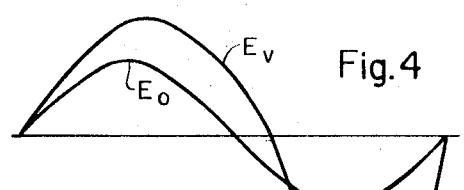
Figure 3:
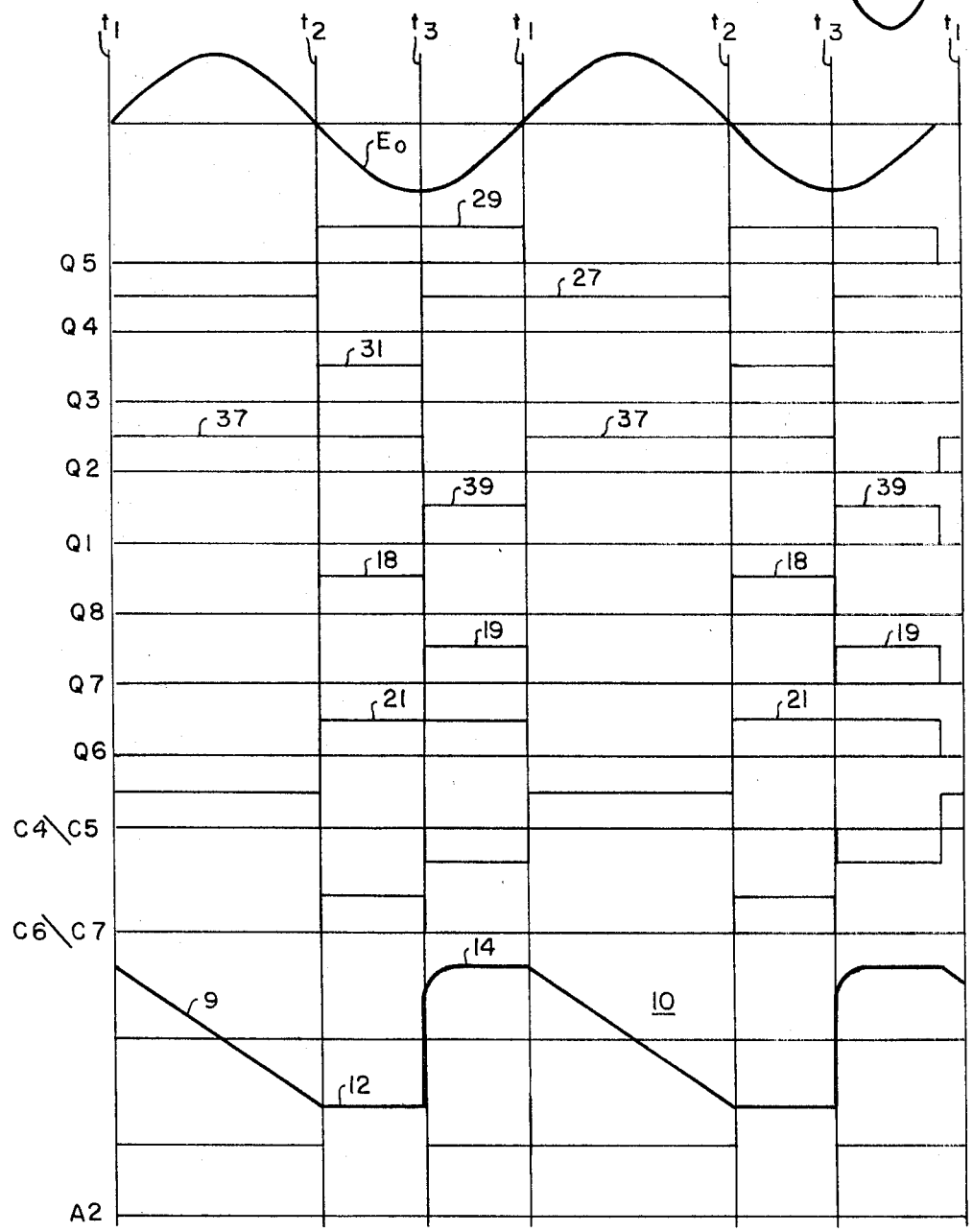

Other objects will be apparent from the description, the appended claims and the drawings in which:

FIG. 1 schematically illustrates a transducer embodying the invention;

FIG. 2 illustrates, in block form, the combination of two such transducers to provide a single output signal which is independent of any changes in the alternating voltage wave shape; and, FIGS. 3 and 4 show curves useful in the understanding of the operation of the transducer.

Referring to the drawings by characters of reference, the numeral 1 indicates generally a frequency responsive transducer having an input transformer 2, the primary winding 4 of which is adapted to be connected to a source of alternating potential $E_o$, the frequency of which is to be measured by the transducer 1. The transformer 2 has an output winding 6 which during one half cycle, shown as the positive half cycle, of the voltage $E_o$ in FIG. 3 actuates the ramp generator 8 whereby it changes its output voltage from an initial to a final voltage solely during this time interval $t_1-t_2$ as indicated by the curve portions 9 of the curve 10. As will be explained subsequently, the final voltage is determined by the length of the interval $t_1-t_2$.

During an initial portion $t_2-t_3$ of the other or negative half cycle of the voltage $E_o$, the output terminal 15 is connected to the input terminal 17 of a charge holding device 16 through a suitable switch which is shown as a field-effect transistor Q8 whereby the final voltage of the generator 8 is utilized to establish a correct final voltage at the output terminal 20 of the charge holding device 16. At a desired length of positive half cycle or with a desired frequency (if the interval $t_1-t_2$ is always equal to 180 electrical degrees) this output voltage at terminal 20 will be of a predetermined magnitude as determined by the adjustment of the variable resistor R22. Thereafter, during the interval $t_3-t_1$ the ramp generator 8 is disconnected from the device 16 and is reset to its initial potential. This operation is schematically indicated by the curved portions 12 and 14. The conductive periods of the transistor Q8 are indicated by the rectangles 18 associated with the line identified Q8. During the intervals $t_3-t_1$ the charge holding device 16 assumes and maintains a potential at its output terminal 20 as determined by the signal applied to its input terminal 17. The resetting of the ramp generator 8 is accomplished by a suitable switching device such as a field-effect transistor Q7. As indicated by the rectangles 19, the transistor Q7 conducts during the interval $t_3-t_1$. The operation of the ramp generator 8 is accomplished by rendering a suitable switching device such as a transistor Q6 nonconducting. These intervals are indicated by the absence of the rectangles 21 which rectangles indicate the conducting time of the transistor Q6.

The conductivity of the transistors Q7 and Q8 is controlled by a plurality of transistors Q1, Q2, Q3, Q4 and Q5. The conduction of transistors Q5 and Q6 is controlled by the polarity of the output potential of the transformer winding 6. The transistors Q1—Q5 have their emitter-collector circuits connected between negative and positive busses 22 and 24. For this purpose each of the emitters of these transistors is connected to the zero potential bus 22. The collectors are connected through resistors R1, R2, R5, R6 and R8, respectively to the positive potential current bus 24. As indicated, a suitable potential between the busses 22 and 24 is 15 volts.

The dotted terminal 23 of the transformer winding 6 is connected through a resistor R34 to a bus section 26 which bus section 26 is connected by means of a capacitor C10 to the bus 22. This provides a noise filter which prevents false operation of the transistors. The base of the transistor Q5 is connected through a resistor R9 to the bus 26 whereby base drive current is supplied to the transistor Q5 when the dotted terminal 23 is positive with respect to its undotted terminal which is connected to the bus 22. The base of the transistor Q4 is connected through a diode D5 to a terminal 25 which terminal 25 is connected through a resistor R7 to the positive bus 24 and through a capacitor C2 to the common point between the resistor R8 and the collector of the transistor Q5. With this connection, base drive current is supplied to the transistor Q4 to maintain it conducting except for a predetermined time period following the rendering of the transistor Q5 conducting, as indicated by the rectangles 27 and 29.

The base of the transistor Q3 is connected through a diode D3 to the common terminal 31 of the resistor R6 and the diode D4. With this arrangement, the transistor Q3 will be held blocked during the intervals in which the transistor Q4 conducts and will conduct during intervals in which the transistor Q4 is nonconducting. The conducting periods of the transistor Q3 are indicated by the rectangles 31.

The base of the transistor Q2 is connected through a diode D1 and resistor R3 to the bus 24. The common terminal 33 of the resistor R3 and diode D1 is connected to one terminal of a capacitor C1. The other terminal 35 of the capacitor is connected through resistor R4 to the bus 24 and through a diode D2 to the collector of the transistor Q4. With this arrangement the transistor Q2 will be held conducting except for a predetermined interval following the rendering of the transistor Q4 conducting as shown by rectangles 37. The base of the transistor Q1 is connected through a resistor R32 to the collector of the transistor Q2 and through a resistor R33 to the negative bus 28 which, for example may be maintained at 15 volts negative with respect to the potential of the bus 22. A filter capacitor C9 is connected between the base of the transistor Q1 and the bus 22. With this arrangement, the transistor Q1 conducts during the nonconductive interval of the transistor Q2 as indicated by the rectangles 39.

The ramp generator 8 may take many forms. It is shown as and preferably comprises an operational amplifier A1 having an input terminal 30 and the output terminal 15, as well as the usual auxiliary terminals 34, 35, 36, 37 and 38. The operational amplifier A1 may conveniently be an amplifier of the type designated ADO-26B and sold by Fairchild Camera & Instrument Corporation of Mountainview, California. Such an operational amplifier utilizes field effect transistors and as such requires very little energy to maintain a signal at its output terminal 15. Capacitors C4 and C5 are connected in parallel with each other between the input and output terminals 30 and 15. The terminal 38 is directly connected to the +15 volts bus 24, the potential supply terminal 35 to the −15 volt bus 28, terminal 36 to the zero potential bus 22, the terminal 37 to the terminal 38 through a variable resistor R17 and the terminal 34 to the bus 22 through resistor R15.

The device 16 preferably comprises an operational amplifier A2 of a type similar to the amplifier A1 and having the usual output terminal 20 and the auxiliary terminals 34, 35, 36, 37 and 38. Similarly capacitors C6 and C7 are connected in parallel with each other between the input and output terminals 17 and 20.

The field effect transistor Q7 has its gate $g$ connected by means of a conductor 40 to the common connection 42 between a resistor R12 and a capacitor C3 which are connected in series in the order mentioned between the collector of the transistor Q1 and the zero potential bus 22. During the intervals in which transistor Q1 conducts, a conducting signal will be applied to the gate $g$ of the transistor Q7 whereby conduction between its source terminal $s$ and its drain terminal $d$ is controlled by the conductive condition of the transistor Q1. The source terminal $s$ is connected to one terminal 44 of the capacitor combination C4/C5 while the drain terminal $d$ is connected to the other terminal 46 of the capacitor combination through a resistor R19. The output terminal 15 of the amplifier A1 is connected through resistors R19 and R20 to a bus 48 maintained at −9 volts with respect to the zero potential bus 22 by means of Zener diode Z2 and voltage dropping resistor R24 which are connected in series between the busses 22 and 28 with the bus 48 connected to the common terminal of the resistor 24 and Zener diode 22.

In order to establish the initial potential of the amplifier A1 a resistor R21 is connected between the source terminals of the transistor Q8 and the output terminal 15 of the amplifier A1. The terminal 41 of the resistor R21 which is connected to the terminal $s$ is connected to a +9 volt bus 52 through a diode D12, a resistor R23 and the variable resistor R22.

When the field-effect transistor Q7 conductors, it connects the terminal 44 of the capacitors C4'C5 to the common terminal 43 of the series connected resistors R19 and R20. Since the input terminal 30 of the amplifier A1 is now connected to the common terminal 43 and since the amplifier A1 may have a gain of 300,000 and will maintain the potential of its input terminal 30 at nearly that of the bus 22, the potential at the output terminal 15, at equilibrium conditions, will assume a potential of +9 volts. This potential is generated by the flow of output current from the amplifier A1 through the resistors R19 and R20 so that the terminal 43 is held at zero volts. When the potential of the output terminal 15 reaches +9 volts, the potential of the common terminal 43 will, because of the equal values of the resistors R19 and R20, become zero and further increase in output potential of the operational amplifier A1 is thereby prevented. The capacitor combination C4/C5 will be charged to 9 volts which is the + output voltage indicated by the distance of the flat portion 14 of the curve 10 above its zero line.

To provide for initiating the operation of the ramp generator 8 at the instant $t_1$ and terminating such charging at the instant $t_2$, the emitter of the transistor Q6 is connected to a bus 54 which is maintained at a voltage of about −0.7 volts. With this arrangement no current is supplied from the +9 volt DC bus 52 to charge the capacitor combination C4/C5 as long as the transistor conducts because the collector thereof will be maintained at the potential of the input terminal 30; the 9 volts being absorbed by the resistor R14 which is connected between the bus 52 and the collector of the transistor Q6. When the transistor Q6 blocks and opens the shunt circuit, the voltage at its collector increases and current flow from the bus 52 through the resistor R14 and diode D11 to charge the capacitor combination C4/C5 at a rate as determined by the RC characteristics of the resistor R14 and the capacitor combination C4/C5.

As indicated in FIG. 3, the transistor Q6 is rendered nonconducting at the time $t_1$ and conducting at the time $t_2$ whereby the interval during which the capacitor C4/C5 are being charged from an external source conforms exactly to the length of the positive half cycle of the voltage wave $E_o$. Therefore, the magnitude of the final voltage will be a measure of the time interval $t_1-t_2$. If the transducer 1 is associated with a wave $E_o$ of constant shape, the output voltage will be a measure of the frequency of the wave $E_o$.

Assuming the transducer 1 is designed to provide a signal indicating a departure from a desired frequency, which for purposes of explanation is 60 Hz, it may be desirable to operate the transducer 1 such that the output terminal 20 of the amplifier A2 has a zero output potential when the frequency of the wave is 60 Hz. To provide for this operation, the magnitude of the resistor R22 is adjusted such that the potential drop across the resistor R21 is exactly the same magnitude as the potential at the output terminal 15 developed when the wave $E_o$ has a 60 Hz. frequency. Since it has been assumed that the output terminal 15 is exactly −9 volts with a 60 Hz. wave of $E_o$ the drop across the resistor should be 9 volts whereby the potential applied to the input terminal 17 through the field-effect transistor Q8 will be exactly 0 volts.

With a zero volt input to its input terminal 17, the operational amplifier A2 will have a 0 volt potential at its output terminal 20. It will be apparent that if a 0 voltage at a different frequency were desired such can be accomplished by varying the magnitude of the resistance of the resistor R22. If the frequency of the wave $E_o$ is not exactly 60 Hz., the time interval during which the transistor Q6 remains blocked will change and the final output voltage at the terminal 15, as indicated by the line 12, will not be exactly −9 volts. Therefore, when the field-effect transistor Q8 conducts, the difference in voltage will cause the amplifier A2 to make its output terminal 20 positive or negative depending upon whether the frequency of the wave $E_o$ increases or decreases.

With no signal applied to the input terminal 17, the output potential of the amplifier A2 should be held at its established magnitude. This is true except for losses in the amplifier A2. Since the preferred amplifier A2 uses field-effect transistors, this loss may be too small to be objectionable at 60 Hz. If such losses, even though small, are objectionable they may be compensated by energy supplied to the input terminal 17 from the potentiometer R31. Similarly the amplifier A1 may have its losses compensated for by energy supplied through the potentiometer R18.

Back-to-back or antiparallel arranged diodes D9 and D10 are connected between the input terminal 30 of the amplifier A1 and the zero potential bus 22 to limit any difference in voltage of this terminal 30 above or below that of the bus 22 to less than 0.07 volt (the forward drop of the diode) to protect the amplifier. Diodes D13 and D14 similarly protect amplifier A2.

It is believed that the remainder of the construction may best by understood from a description of operation of the transducer 1 which is as follows: During the interval $t_1-t_2$ of the wave $E_o$, the dotted terminal 23 of the winding 6 will be maintained negative with respect to the undotted terminal thereby and the transistors Q5 and Q6 will be held nonconducting. This is indicated by the absence of the rectangles 29 and 21. Because of the blocked condition of the transistor Q6, charging current will flow to the capacitor combination C4/C5 through the resistor R14 and diode D11. The current flow changes the charged condition of the capacitors C4/C5 and the output potential of the ramp generator 8 will change as indicated by the curve portion 9.

At the next zero crossing of the wave $E_o$ (time $t_2$), the transistors Q5 and Q6 will be rendered conducting. The rendering of the transistor Q6 conducting terminates further charging current flow to the capacitor combination C4/C5 and no further change in output potential at the output terminal 15 will take place. This is indicated by the curve portions 12. The rendering of the transistor Q5 conducting terminates the base drive current to the transistor Q4 for the charging period of the capacitor C2 whereby the transistor Q4 is held nonconducting or blocked for the period of time $t_2-t_3$ as indicated by the absence of a rectangle 27.

During the blocked interval of the transistor Q4, base drive current flows to the transistor Q3 to render it conducting for the time interval $t_2-t_3$. This is indicated by the rectangles 31. Conduction of the transistor Q3 renders the field-effect transistor Q8 conductive to connect the output terminal 15 of the ramp generator 8 to the input terminal or connection 17 of the charge holding device 16 through the resistor R21. During this conducting period of the transistor Q8, the charge across the capacitor combinations C6/C7 connected between the input and output terminals 17 and 20 of the amplifier A2 changes in accordance to the magnitude of the output potential 12 of the amplifier A1 and the output potential at the output terminal 20 is regulated to indicate the frequency of the wave $E_o$.

At the end of the charging time of the capacitor C2 (time $t_3$) base current again flows in the transistor Q4, rendering it conducting as indicated by the rectangle 27. This terminates further conduction of the transistors Q3 and Q8 and the amplifier A2 is disconnected from amplifier A1. The reconduction of the transistor Q4 initiates a charging period ($t_3-t_1$ of the capacitor C1. During this period $t_3-t_1$, base current flow to the transistor Q2 is interrupted and it becomes nonconducting as indicated by the absence of the rectangle 37. During the conductive periods ($t_1-t_3$) of the transistor Q2, no base current flows in the transistor Q1 and it remains blocked. When the transistor Q2 is rendered nonconducting, base current flows in the transistor Q1 which thereupon conducts for the intervals ($t_3-t_1$) as indicated by the rectangles 39. Conduction of transistor Q1 causes gate current flow and renders the field-effect transistor Q7 conducting to reestablish the initial 9 volt potential across the capacitor combination C4/C5 as described above and reestablished the initial output voltage 14 at the output terminal 15.

Referring now to FIG. 4S it may be understood that the transducer will respond to changes in wave shape. As previously described, the wave shape $E_o$ was assumed to be that of a sine wave as indicated in FIG. 3 and by the like designated curve $E_o$ of FIG. 4. If the frequency remained constant but the wave shape varied as indicated by the curve $Ev$ of FIG. 4, it will be appreciated that the interval during which the ramp generator 8 is actuated is increased. This increased interval results in an increase in the magnitude of the negative voltage of the curve portion 12 which when applied to the amplifier A2 will result in a change in the output voltage at the output terminal 20 of the transducer. If the frequency of the wave $Ev$ is constant, this change in voltage at the output terminal 20 will indicate a change in wave shape.

If a device to indicate frequency irrespective of change in wave shape is desired, two transducers 1A and 1B of the construction described in FIG. 1 it may be combined together as indicated in block form in FIG. 2. In this combination the transducer 1A is connected at one polarity with respect to the wave $Ev$ to measure the positive cycle portion thereby and the transducer 1B is to measure the positive cycle portion connected in opposite polarity to measure the negative cycle portion of the wave $Ev$. When the outputs are combined as shown the output potentials at the output terminals 20A and 20B of the two transducers 1A and 1B are connected through resistors 60 and 62 of equal value to the input terminal 64 of an operational amplifier A3 of the type above-described. The operational amplifier A3 is provided with parallel connected resistors 66 and capacitor 68 connected between its output and input terminals 70 and 64. With such an arrangement the output voltage at terminal 70 is equal to the sum of the output voltages of the devices 1A and 1B. Since the magnitude of these voltages is dependent solely on time, it will be apparent that the device of FIG. 2 totals the time intervals of the cycle portions and the output voltage at terminal 70 is a function of frequency and is independent of wave shape.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

What I claim and is desired to be secured by United States Letters Patent is as follows:

1. A frequency sensitive transducer comprising, a pair of input terminals adapted to be energized from a source of alternating potential the frequency of which is to be sensed, a ramp generator adapted upon actuation to alter its output quantity as a function of time, a potential sensitive network having an input connection connected to said terminals and an output connection connected to said ramp generator, said potential sensitive network including first switch means, said first switch means being effective during a first predetermined portion of the alternating voltage wave of the potential supplied to said input terminals to actuate said generator whereby said output quantity is effective to be altered in accordance with said function solely during said first interval, second switch means connected to said ramp generator, said second switch means being actuable to place the output quantity of said ramp generator in an initial condition during a second predetermined portion of said alternating voltage wave, and delay means effective to provide a predetermined interval between said first and said second intervals.

2. A frequency sensitive transducer comprising, a pair of input terminals adapted to be energized from a source of alternating potential the frequency of which is to be sensed, a ramp generator adapted upon actuation to alter its output quantity from an initial condition as a function of time, a potential sensitive network having an input connection connected to said terminals and an output connection connected to said ramp generator, said potential sensitive network being effective during a first predetermined portion of the alternating voltage wave of the potential supplied to said input terminals to actuate said generator whereby said output quantity is effective to be altered in accordance with said function, said potential sensitive network being actuable during a second predetermined portion of said voltage wave to place the output quantity of said ramp generator in said initial condition, said second portion being spaced from said first portion, a quantity holding network having an input means and an output means effective to maintain an output quantity at its output means as established by an input quantity applied to its input means, circuit means connecting said input means of said holding network to said ramp generator for energization by its said output quantity, selectively actuatable means connected to said input means of said holding network, said selectively actuable means being effective to make said connection subsequent to said first predetermined wave portion and prior to said second predetermined wave portion.

3. The combination of claim 2 in which said selectively actuable means is connected to said potential sensitive network whereby said connection of said holding network to said ramp generator is made for a third predetermined portion of said voltage wave applied to said input terminals.

4. The combination of claim 3 in which said first predetermined portion is the interval between two consecutive zero potential points on said wave and in which said third and said second predetermined portions occur during the interval between the last of said two zero points and the next zero point to follow said last of said two zero points.

5. The combination of claim 3 in which said first predetermined portion is the interval during which said wave is of one polarity and in which said second and said third portions occur separately during the interval in which said wave is of a polarity opposite to said one polarity.

6. The combination of claim 5 in which said ramp generator and said quantity holding network are operational amplifiers and in which said selectively actuable means is a switch.

7. The combination including a pair of transducers as set forth in claim 6 and in which said output means of each of said holding networks are connected together in algebraic addition and in which said one polarity of one of said transducers is of opposite polarity to said one polarity of the other of said transducers.

8. An article of manufacture comprising a first operational amplifier having a first input connection and a first output connection and first capacitive means connected between its said input connection and its said output connection, a first source of potential, a first switching means, a first impedance element, a first circuit connecting said source to said input connection and including said switching means and said impedance element, a pair of input terminals adapted to be energized from a source of spaced potential pulses of a first polarity, a second circuit connecting said switching mans to said input terminals, said switching means being operable to render said first circuit conductive during said pulses to alter the charged condition of said capacitive means, a second switching means, a third circuit including said second switching means connected to said capacitive means, and a fourth circuit connecting said second switching means to said input terminals, said second switching means being operable during the intervals between said pulses to establish an initial charged condition of said capacitive means.

9. The combination of claim 8 in which there is provided a second impedance element having an intermediate tap, a second source of potential, a fifth circuit connecting said output connections to said second source through said second impedance element, said third circuit means connecting said second switching means between said tap and said input connection.

10. The combination of claim 9 in which said tap is located at the midpoint of the magnitude of the impedance of said second impedance element and said second source of potential is of a polarity opposite to that of said first source of potential.

11. The combination of claim 9 including a second operational amplifier having a second input connection and a second output connection and a second capacitive means, said second output connecting a third switching means, third and fourth impedance elements, a sixth circuit connecting said third and said fourth impedance elements in series between said first source of potential and said first output connection, a seventh circuit connecting the common point of said third and fourth impedance elements to said second input connection.

12. The combination of claim 11 in which the relative magnitudes of the impedance of said third and fourth impedance elements is such that the potential drop between said common point and said first output connections is equal to the potential developed at said first capacitive means when the duration of said spaced pulse is equal to an established time interval.

13. The combination of claim 8 in which said first switching device comprises a first diode connected in said first circuit between said first impedance element and said first input connection and a switch having a controlled diode, said controlled diode being connected in shunt circuit with said first diode, said shunt circuit including means establishing a voltage therein which is of a polarity to compensate at least in part for the potential drop across said controlled diode.